United States Patent Office 3,402,040
Patented Sept. 17, 1968

3,402,040
WEED CONTROL WITH 1 - (TETRAHYDRODICY-CLOPENTADIENYL)-3,3-DIMETHYL UREA AND 2 - CHLORO - 4 - ETHYLAMINO - 6 - ISOPROPYL-AMINO-1,3,5-TRIAZINE
Walter W. Fassig, Newark, Del., assignor to Hercules Incorporated, Wilmington, Del., a corporation of Delaware
No Drawing. Filed June 1, 1966, Ser. No. 554,347
1 Claim. (Cl. 71—93)

ABSTRACT OF THE DISCLOSURE

Weeds in sorghum fields are inhibited in growth by applying a mixture of 1-(tetrahydrodicyclopentadienyl)-3,3-dimethyl urea and 2-chloro-4-ethylamino-6-isopropylamino-1,3,5-triazine in the ratio of from 3:1 to 1:1 to the sorghum field at a rate of 1 to 6 pounds per acre.

---

This invention relates to new herbicide compositions and to methods for controlling weeds therewith.

The great variety of weeds growing in row crops requires a broad spectrum herbicide which is effective over a wide range of growing conditions. Moreover, it is particularly desirable to obtain a fast kill of the weeds early in the growing period of the desired crop.

Atrazine (2-chloro-4-ethylamino-6-isopropylamino-1,3,5-triazine) is a broad spectrum herbicide which is useful for preemergence control of weeds. However, it is not successful in those cases where the crop is sensitive to the residual herbicide in the soil. Such crops as sorghum are particularly sensitive to residual atrazine.

In accordance with the present invention, it has now been found that the deficiencies of atrazine are overcome by using a composition of norea and atrazine as herbicides and applying the combination to a mixed growth of weeds to be controlled.

Norea, which is 3-(3a,4,5,6,7,7a-hexahydro-4,7-methanoindan-5-yl)-1,1-dimethyl urea also known as 1-tetrahydrodicyclopentadienyl-3,3-dimethyl urea, is prepared stepwise from dicyclopentadiene by: Step 1: reaction with HSCN to form the isothiocyanate, A; Step 2: reaction of A with dimethyl amine to form the thiourea, B; Step 3: hydrolysis of B to form the urea, C; Step 4: hydrogenation of C to form norea.

The composition of this invention is particularly useful in controlling weed growth in sorghum fields, especially where the soil conditions make preemergence control difficult with atrazine alone.

In the compositions of this invention, norea and atrazine are used in a ratio in the range of about 3:1 to 1:1, to produce a composition which can be used against a wide variety of broad leaf weeds without harming sorghum when applied at the rate of 1 to 6 pounds of the composition per acre.

The composition of norea and atrazine is particularly useful as a complete herbicide for weeds in sorghum fields and is not harmful to sorghum in dosages requisite for the control of weeds.

The use of compositions of norea and atrazine is illustrated by the following examples in which the 80% norea was Herban (Reg. U.S. Patent Office), a composition in which the other components are 14% clay (attasorb), 3% dispersing agent, and 1.5% wetting agent, and the atrazine was likewise an 80% wettable powder having a similar content of clay, dispersing agent and wetting agent.

The essential ingredients of the herbicide compositions of this invention are norea, atrazine and a surface-active agent to aid in producing an aqueous dispersion. Surface-active agents of the anion, cationic, and non-ionic types may be used. Examples of such surface-active agents are well known in the herbicide art. A finely divided inert carrier such as a clay may also be used and the concentrate may be a liquid or a wettable powder.

Examples

For purposes of these examples, an area in a Nebraska farm which had grown up in heavy pigweed was selected for tests. The soil in the test area was worked to a depth of six inches, raked and leveled.

The weed population was composed mainly of foxtail, pigweed, water hemp, and carpet weed with lesser amounts of crabgrass, mallow, ground cherry, and purslane present in all plots as untreated blanks.

A field so prepared was planted in sorghum (Pioneer 846) at a seeding rate of 5.6 pounds per acre. This field was planted in plots of rows 40 inches apart. For weed count purposes, areas of 4 rows 30 feet long with 4 replications were taken.

Aqueous compositions of atrazine and norea were made from 80% dispersible concentrates of these materials. Thus, sprayable compositions were produced by mixing various amounts of the concentrates in the amount of water required for an acre. For example, for spraying 2.4 lbs./acre, each of 80% norea and 80% atrazine, a 36-gallon batch containing 2.4 lbs. each of 80% norea wettable powder and 80% atrazine wettable powder in dispersion was prepared in a tank. This was then sprayed uniformly over the test plots in a fine spray, using proportionably less than the full amount for less than an acre.

The plots were sprayed with compositions prepared as above 8 days after the sorghum was planted, and the weed count was made 30 days after spraying. Weed counts were made on an area 15 feet long and 40 inches wides between two rows of sorghum. The weed count was made on pigweed as the predominant weed, as well as on total weeds. The sorghum was uninjured in this treatment. The results of the count are tabulated below:

| Herbicide Composition rate of Application (lb./acre) | | Total Living Weeds | | Percent Control | |
|---|---|---|---|---|---|
| Norea | Atrazine | Pigweed | All Weeds | Pigweed | All Weeds |
| 0 | 0 | 7,085 | 9,657 | | |
| 1.2 | | 2,097 | 2,869 | 70.4 | 70.3 |
| | 1.2 | 2,229 | 3,443 | 68.5 | 64.4 |
| 1.2 | 1.2 | 80 | 519 | 98.9 | 94.6 |
| 2.4 | | 772 | 1,279 | 89.1 | 86.8 |
| | 2.4 | 702 | 1,027 | 90.1 | 90.4 |
| 1.6 | 0.8 | 61 | 354 | 99.3 | 96.4 |

What I claim and desire to protect by Letters Patent is:
1. The method of controlling the growth of weeds of both broad leaf and grassy species in sorghum fields which comprises applying to the locus of said weeds a composition of (1) 1-(tetrahydrodicyclopentadienyl)-3,3-dimethyl urea and (2) 2-chloro-4-ethylamino-6-isopropylamino-1,3,5-triazine in a ratio of (1) to (2) in the range of 3:1 to 1:1 at a total rate of 1 to 6 pounds per acre.

References Cited

UNITED STATES PATENTS 3,022,150  2/1962  Weed _____ 71—93
3,304,167  2/1967  Buntin et al. _____ 71—119

JAMES O. THOMAS, Jr., *Primary Examiner.*